United States Patent [19]

Levien

[11] Patent Number: 4,523,271
[45] Date of Patent: Jun. 11, 1985

[54] SOFTWARE PROTECTION METHOD AND APPARATUS

[76] Inventor: Raphael L. Levien, Rte. 1, Box 19, McDowell, Va. 24458

[21] Appl. No.: 390,885

[22] Filed: Jun. 22, 1982

[51] Int. Cl.³ .................. G06F 9/00; G06F 13/00; G06F 11/30
[52] U.S. Cl. .................. 364/200; 178/22.01
[58] Field of Search .................. 364/200, 900; 178/22.01, 22.09, 22.19

[56] References Cited

U.S. PATENT DOCUMENTS

| | | | |
|---|---|---|---|
| 3,263,218 | 7/1966 | Anderson | 340/172.5 |
| 3,264,615 | 8/1966 | Case et al. | 340/172.5 |
| 3,271,744 | 9/1966 | Petersen et al. | 340/172.5 |
| 3,328,765 | 6/1967 | Amdahl et al. | 340/172.5 |
| 3,328,768 | 6/1967 | Amdahl et al. | 340/172.5 |
| 3,340,539 | 9/1967 | Sims, Jr. | 346/74 |
| 3,377,624 | 4/1968 | Nelson et al. | 340/172.5 |
| 3,573,855 | 4/1971 | Cragon | 340/172.5 |
| 4,040,034 | 8/1977 | Belady et al. | 364/200 |
| 4,120,030 | 10/1978 | Johnstone | 364/200 |
| 4,125,891 | 11/1978 | Sauger | 364/200 |
| 4,168,396 | 9/1979 | Best | 178/22 |
| 4,183,085 | 1/1980 | Roberts et al. | 364/200 |
| 4,246,638 | 1/1981 | Thomas | 364/200 |
| 4,278,837 | 7/1981 | Best | 178/22.09 |
| 4,355,389 | 10/1982 | Sato et al. | 371/18 |
| 4,357,529 | 11/1982 | Atalla | 235/380 |
| 4,408,119 | 10/1983 | DeCavele | 235/382 |

*Primary Examiner*—Raulfe B. Zache
*Assistant Examiner*—A. E. Williams, Jr.
*Attorney, Agent, or Firm*—Lowe King Price & Becker

[57] ABSTRACT

In a microprocessor system, data stored in a protected memory (12) within the same housing as the microprocessor (10) are secured by enabling access to the contents of the memory in response to an instruction only if the instruction was previously fetched from the memory (12). Protection circuitry (14) comprises a decoder (22, 24) responsive to the output of a status register in the microprocessor to operate a status signal when the microprocessor is in an instruction fetch machine cycle. The status signal is stored (26) until the protected memory (12) is selected by the microprocessor (10). Access to data in the protected memory (12) is enabled only if the status signal is stored during memory select or the microprocessor is in an I/O machine cycle for communication with a peripheral. In addition, voltage controlled switches within the housing place the bus in a HALT state during memory select unless the microprocessor is in an I/O machine cycle. The protection circuitry (14) is disabled by a fuse (36) within the housing for memory content verification. Following verification, the fuse (36) is blown to secure the memory (12).

14 Claims, 2 Drawing Figures

| MACHINE CYCLE | | STATUS | | | CONTROL | | |
|---|---|---|---|---|---|---|---|
| | | IO/M | S1 | S0 | RD | WR | INTA |
| OPCODE FETCH | (OF) | 0 | 1 | 1 | 0 | 1 | 1 |
| MEMORY READ | (MR) | 0 | 1 | 0 | 0 | 1 | 1 |
| MEMORY WRITE | (MW) | 0 | 0 | 1 | 1 | 0 | 1 |
| I/O READ | (IOR) | 1 | 1 | 0 | 0 | 1 | 1 |
| I/O WRITE | (IOW) | 1 | 0 | 1 | 1 | 0 | 1 |
| ACKNOWLEDGE OF INTR | (INA) | 1 | 1 | 1 | 1 | 1 | 0 |
| BUS IDLE | (BI): DAD ACK. OF RST. TRAP | 0 | 1 | 0 | 1 | 1 | 1 |
| | | 1 | 1 | 1 | 1 | 1 | 1 |
| | HALT | TS | 0 | 0 | TS | TS | 1 |

| MACHINE CYCLE | | STATUS | | | CONTROL | | |
|---|---|---|---|---|---|---|---|
| | | IO/M | S1 | S0 | RD | WR | INTA |
| OPCODE FETCH | (OF) | 0 | 1 | 1 | 0 | 1 | 1 |
| MEMORY READ | (MR) | 0 | 1 | 0 | 0 | 1 | 1 |
| MEMORY WRITE | (MW) | 0 | 0 | 1 | 1 | 0 | 1 |
| I/O READ | (IOR) | 1 | 1 | 0 | 0 | 1 | 1 |
| I/O WRITE | (IOW) | 1 | 0 | 1 | 1 | 0 | 1 |
| ACKNOWLEDGE OF INTR | (INA) | 1 | 1 | 1 | 1 | 1 | 0 |
| BUS IDLE | (BI): DAD | 0 | 1 | 0 | 1 | 1 | 1 |
| | ACK. OF RST. TRAP | 1 | 1 | 1 | 1 | 1 | 1 |
| | HALT | TS | 0 | 0 | TS | TS | 1 |

SOFTWARE PROTECTION METHOD AND APPARATUS

TECHNICAL FIELD

The present invention relates generally to software protection and more particularly, toward a method of and system for preventing unauthorized access to data within a protected memory of a microcomputer.

BACKGROUND ART

A computer consists of a central processor unit, I/O control, peripheral devices and memory. The memory contains instructions and data that are combined and grouped to form at least one program. One class of programs, known as applications or utility programs, solve a problem or perform some other utilitarian function. The other class of programs, called control or executive programs, perform a variety of housekeeping and control functions that are essential to the operation of a computer. In each type, instructions and data are generally encoded into different portions of the same memory.

Data stored in the memory are accessed by the processor in the following manner. The processor is first controlled to read an instruction stored in the memory in an instruction fetch, sometimes termed OP-FETCH, machine cycle. The instruction is then used by the processor to read data stored elsewhere in the memory during a subsequent READ MEMORY machine cycle. The memory is selected for operation by a memory decoder on the address bus of the processor.

The contents of the memory may in some cases be proprietary. Particular types of data that may be proprietary include account information in electronic funds transfer systems, government classified information and personal data. Software stored in memory is commonly proprietary so that it can be classified as a trade secret. A memory containing such data or software is termed herein "protected memory". The memory may be of a read only type (ROM), a programmable type (PROM), random access type (RAM) or other type. Software stored in ROM or PROM is commonly termed firmware rather than software. The term software is used herein, however, to designate firmware as well as software for convenience.

In the past, several different approaches for protecting software have been taken. In addition to legal forms of protection which is beyond the scope of this discussion, a number of hardware based protection systems have been developed. One form involves assigning a secret number, or key, to the software, making the number available to only the authorized user and requiring the user to keyboard enter the secret number to enable access to data stored in the memory. The secret number is thereafter scrambled and compared with a corresponding number stored within the memory; access to the memory is permitted only if there is a positive match. This type of system tends to be hardware intensive and is possible to overcome by obtaining the secret number or breaking the scrambling algorithm.

Other types of software protection systems are software based. In one system, programming produces a sequence of executable codes in a normal manner but prohibits the user from randomly accessing the memory addresses. A secret executive routine contains a table of the legal next steps for every given step in the program. Only those steps listed in the table can be accessed by the user. If a program contains a branch to one of two places, only those two places can be examined by the programmer at that time. If the program contains enough branches it will be virtually impossible for the user to run through every permutation of the program to obtain a complete listing of the code.

Another system involves monoalphabetic substitution, wherein each byte of a program is replaced by a substitute byte. Each byte of the enciphered program is deciphered when needed by simple table look-up using a substitution table.

Some systems involve particular formatting of data on a storage disc; the format is altered by changing data locations. Other systems use memory bounds, wherein registers store the upper and lower bounds for data to be read, written or instructions to be fetched. Each memory request is address compared with the stored address bounds to determine whether access is permitted.

All of the software protection systems of which I am aware are deficient in one form or another, either by requiring excessive hardware or software or by limiting use by authorized user, e.g., making it impossible to make back-up copies or requiring substantial additional software or storage. The software further is not completely secure against unauthorized access or is not microcomputer compatible.

DISCLOSURE OF INVENTION

One object of the invention is to provide a software protection method and apparatus wherein software is made highly secure against unauthorized access. Another object is to provide such a method and apparatus wherein the amount of hardware or software added to the computer is minimized. Another object is to provide such a method and system that are microcomputer compatible.

These and other objects are satisfied in a microprocessor based system in accordance with the invention by protective circuitry that monitors microprocessor status to identify an instruction fetch machine cycle and in response generates a status signal which is stored until a subsequent memory select cycle. Each time a memory select (access) signal is generated indicating that access to a protected memory within the same housing at the microprocessor is required, the state of the stored status signal is examined to determine whether the processor has previously operated in an instruction fetch cycle of the processor is in an I/O cycle to communicate with a peripheral. Access to the memory is thereafter enabled only if access is in response to an instruction that was previously fetched from the same memory or the processor in an I/O cycle.

In accordance with another aspect of the invention, voltage controlled switches are provided in the bus within the housing of the microprocessor. Logic circuitry opens the switches and thereby places the bus in a HALT state if the protected memory is being accessed and the processor is not communicating with peripherals in an I/O machine cycle through the bus.

As another aspect, a fuse within the microprocessor housing, until blown, disables the protection circuitry. Following verification of the contents of the memory, the fuse is blown by applying an external voltage to enable the protection circuity.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various, obvious respects, all without departing from the invention. Accordingly, the drawings and description are to be regarded as illustrative in nature, and not as restrictive.

BEST MODE FOR CARRYING OUT THE INVENTION

Figures 1, 2:
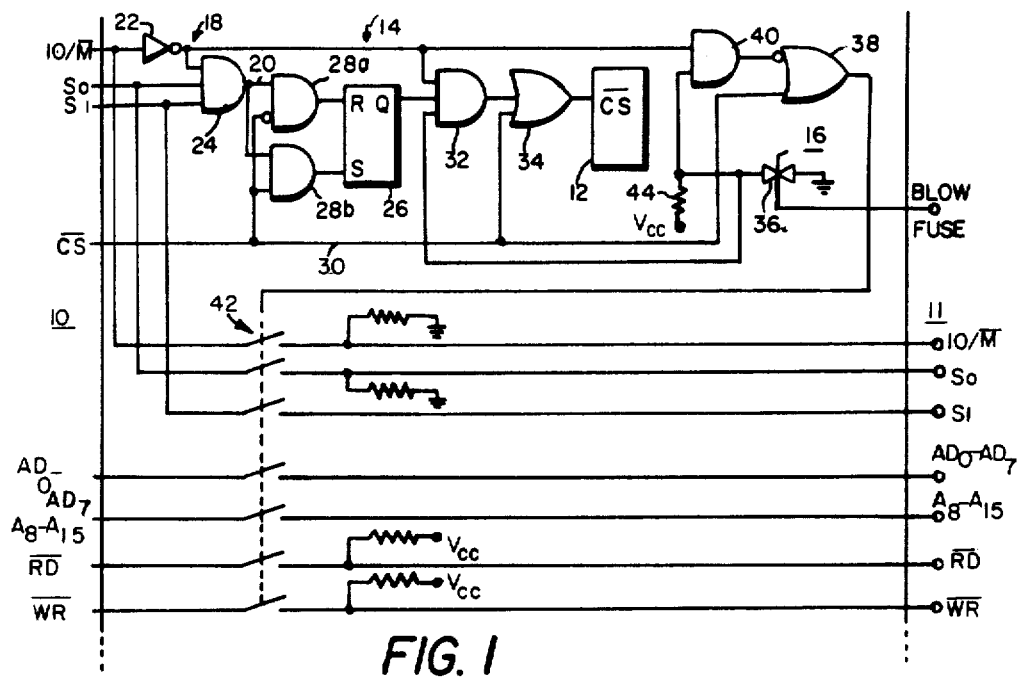
FIG. 1 is a diagram showing a preferred embodiment of the software protection circuitry of the present invention.
FIG. 2 is a tabulation of status and control signals as a function of machine cycles for an exemplary microprocessor.

In accordance with one aspect of the invention shown in FIG. 1, access to a protected memory 12 in the same housing as a microprocessor 10 is enabled only if the memory is being accessed in response to an instruction originally fetched by the microprocessor from the same memory. In other words, access to the protected memory is blocked if the instruction originated outside the memory. Access to the memory is enabled, however, if the microprocessor is in an I/O operation cycle in communication with a peripheral.

As an overview, access to memory 12 is controlled by protection circuitry 14 shown in FIG. 2 that monitors microprocessor status and in response develops a microprocessor status signal. Logic within the protection circuitry responds to the status signal to control access to the protected memory. Further logic is coupled to voltage controlled switches in the bus within the housing to place the bus in HALT during memory access unless the microprocessor is in an I/O operating cycle. A fuse 36 disables the protection circuitry 14 to enable the contents of the memory 12 to be verified. The protection circuitry 14 is enabled by blowing the fuse.

With reference now to FIG. 1 in more detail, processor 10 of a computer is preferably, but not necessarily, a microprocessor. As one example, processor 10 may be a type 8085 microprocessor manufactured by Intel Corporation of Santa Clara, Calif. Microprocessor 10 has a 16 bit address bus and an 8 bit bi-directional data bus. The address bus consists of lines $AD_0$-$AD_7$ and $A_8$-$A_{15}$. The data bus consist of lines $AD_0$-$AD_7$. The lines $AD_0$-$AD_7$ are multiplexed to function alternatively as address and data lines. Lines $A_8$-$A_{15}$ carry the most significant 8 bits of memory address (or I/O address); lines $AD_0$-$AD_7$ carry the lower 8 bits of the memory address (or I/O address) during a first clock cycle of a machine cycle and then carry the data during the second and third clock cycles. Reference is made herein to the 8085 specification sheets published by Intel as well as to any of numerous textbooks published on this subject, such as Soucek, Branko, *Microprocessors and Microcomputers*, John Wiley and Sons, 1976.

The microprocessor 10 includes a status register that generates status signals IO/M, $S_0$ and $S_1$ that identify various machine cycles in which the microprocessor 10 is designed to operate. These cycles and corresponding status signals are identified in Table 2. The microprocessor is in a housing (not shown) and interfaces with external devices through a number of buses connected between the microprocessor "chip" and external terminals 11 of the housing. The buses include address lines $A_8$-$A_{15}$ and multiplexed address data lines $AD_0$-$AD_7$ as discussed above in more detail. Additional lines include status line IO/$\overline{M}$, $S_0$, $S_1$ as well as chip (memory) select $\overline{CS}$, memory read ($\overline{RD}$) and memory write ($\overline{MR}$). The microprocessor 10 is thus considered to be based upon a "bus oriented" architecture.

A memory 12, which is preferably a read only memory (ROM) but which could be a programmable read only memory (PROM) or a random access memory (RAM) contains instructions and data stored in digital format in different portions of the memory. Memory 12 is located in the same housing as the microprocessor 10. ROM 12 in accordance with the invention contains proprietary data which is to be accessed by microprocessor 10 but is not to be accessible from outside the housing through the various external terminals of the data bus $AD_0$-$AD_7$.

Thus, in accordance with the invention, software protection circuitry 14 enables the data stored in protected memory 12 to be accessed only by microprocessor 10 and not to be externally accessible, that is, not accessible on the data bus $AD_0$-$AD_7$ from the external data terminals 11 of the microprocessor. The software protection circuitry 14 monitors the operating status of the microprocessor 10. Upon selection of the protected memory for access of data, the protection circuit 14 determines whether the access of data is in response to an instruction previously fetched from the protected memory or whether the microprocessor is in an I/O operating cycle. The protection circuitry 14 inhibits access of memory 12 if the instruction was not previously fetched from the memory, i.e., has originated from some other source. The software protection circuitry 14 further silences the bus, i.e., places the bus in a HALT state, whenever memory 12 is being selected so that any data being accessed from the memory is not available at the external terminals 11 of the microprocessor. Finally, the protection circuit 14 is inhibited by a fuse 16 to enable verification of the contents of the memory. Following destruction of the fuse 16, the protection circuitry 14 becomes operative.

Software protection circuit 14 comprises a decoder 18 which generates a status signal on line 20 when the microprocessor 10 is in an instruction fetch (OP-FETCH in the 8085 microprocessor) machine cycle. The decoder 18 comprises an inverter 22 connected to the output of the IO/$\overline{M}$ terminal of the microprocessor 10 and an AND gate 24 having inputs connected respectively to the output of inverter 22, to status line $S_0$ and to status line $S_1$. The output of gate 24 thus generates a logic one signal when the status lines IO/$\overline{M}$, $S_0$ and $S_1$ are respectively at 011. Referring to the chart in FIG. 2, the status code 011 identifies an OP-FETCH machine cycle, so that the gate 24 identifies instruction fetch. Two status signals are thus developed; a first logic one status signal at the output of inverter 22 indicates that the microprocessor is in a memory cycle rather than an I/O cycle and a second logic one signal at the output of gate 24 indicates that microprocessor 10 is in an instruction fetch cycle.

The second status signal at line 20 is applied through AND gates 28a, 28b to a storage device 26 which is preferably a set reset (R-S) flip flop of a conventional type wherein the output Q is latched at logic one upon application of logic one signal on input terminals S and is latched at logic zero upon application of a logic one signal to input terminal R.

Gate 28a has one input connected to the output of gate 24 and another input connected, following inversion, to chip select $\overline{CS}$ line 30. The line 30 is at logic zero when memory 12 is being selected for an operation. This signal is derived from the address bus of microprocessor 10 through memory decoding which may be provided in a conventional manner, e.g., by a model 3205 ROM decoder not shown herein for brevity. Gate 28b has one input connected to the output of gate 24 and a second input connected directly to $\overline{CS}$ line 30.

Each time memory 12 is selected for an operation (read or write), line $\overline{CS}$ is at logic zero. When the output 20 of gate 24 is at logic one, indicating that microprocessor 20 is in an instruction fetch cycle, the output of gate 28a is at logic one and the output of AND gate 28b is at logic zero. In response, the output Q of flip flop 26 is at logic zero.

The logic zero signal developed by flip flop 26 is applied to protected memory 12 through one input of AND gate 32 and one input of OR gate 34. AND gate 32 has a second input connected to the output of inverter 22 and a third input connected to the output of a fuse 36 preferably within the microprocessor housing. OR gate 34 in turn has a second input connected to $\overline{CS}$ line 30.

The logic zero output Q of flip flop 26 causes the output of gate 32 to be at logic zero. The output of OR gate 34 is thus controlled by the $\overline{CS}$ line 30. When the $\overline{CS}$ line is at logic zero, indicating that the memory 12 is being selected by microprocessor 10, the output of OR gate 34 is at logic zero, enabling the protected memory to be accessed. In other words, the memory protection circuit 14 enables the protective memory 12 to be accessed because the instruction requesting access to memory 12 was previously fetched from the memory during an instruction fetch (OP-FETCH) cycle.

On the other hand, if microprocessor 10 has not immediately previously executed an OP-FETCH cycle, the output 20 of gate 24 is at logic zero. In response, the output of gates 28a, 28b are respectively at logic zero, one; the output of flip flop 24 is at logic one. Assuming that the output of fuse 36 is at logic 1 (the fuse has been blown), the output of gate 32 is controlled by the output of inverter 22. The output of inverter 22 is at logic zero during an I/O cycle and at logic one during a memory (read or write) cycle. Thus, during an I/O cycle, the output of AND gate 32 is at logic zero, enabling the contents of memory 12 to be accessed in response to a logic zero signal on $\overline{CS}$ line 30. During a memory operation, however, the output of gate 22 is at logic one causing the output of gate 32 to be at logic one. The output of OR gate 34 is thus maintained at logic one, maintaining memory 12 non-accessible.

A series of voltage controlled switches 42 in the buses and lines within the same housing as the microprocessor 10 and memory 12 is controlled by logic within protection circuitry 14 to place the buses and lines in a HALT state during memory select, unless the microprocessor is in an I/O operating cycle. AND gate 40 has one input connected to the output of inverter 22 and a second input connected to the output of fuse 36. Assuming the fuse is blown, the fuse output is at logic one and the output of gate 40 tracks the output of inverter 22, that is, at logic one during a memory cycle and at logic zero during an I/O cycle.

OR gate 38 has one input connected, through an inversion, to the output of gate 40 and a second input connected to the $\overline{CS}$ line 30. The output of gate 38 is applied to control switches 42. A logic one output closes the switches 42, a logic zero output opens them.

Thus, during memory select, $\overline{CS}$ on line 30 is at logic zero and the output of OR gate 38 tracks IO/$\overline{M}$. The buses and lines are placed in a HALT state (open) during a memory cycle M and are closed during an I/O cycle. In other words, the buses and lines are halted during memory select unless the microprocessor is in I/O.

During absence of memory select, $\overline{CS}$ on line 30 is at logic one and the output of OR gate is at logic zero, maintaining the buses and lines in HALT, independent of the microprocessor IO/$\overline{M}$ operating status.

Fuse 36 has one end grounded and the opposite end connected to a source $V_{cc}$ of logic one through a resistor 44. When the fuse 36 is intact, the output of the fuse connected to gates 32, 40 is at logic zero, disabling circuit 14 whereby data in protected memory 12 are accessible and the buses and lines switches 42 are closed. The fuse 36 thus provides verification of the contents of the memory 12. Following verification, fuse 36 is blown by applying a suitable voltage to the "blow fuse" external terminal. Thereafter, the output of the fuse 36 is at logic one and protection circuitry 14 is fully enabled.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

I claim:

1. In a computer having a processor unit, a memory and a bus for interfacing said processor unit and said memory, said processor unit being operative to fetch instructions and access data stored in said memory, an apparatus for protecting data stored in said memory, comprising means for applying a "read data" instruction to said processor unit, memory access means for detecting a memory access signal generated by said processor unit to access data stored in said memory in response to said instruction, monitoring means for determining whether said instruction was previously fetched from said memory and means responsive to said memory access means and said monitoring means for enabling memory access only if said instruction was previously fetched from said memory.

2. In a computer having a processor unit, a memory having stored therein instructions and data and a bus for interfacing said processor unit and said memory, said processor unit being operative in a first machine cycle to fetch instructions stored in said memory, at least some of said stored instructions instructing said processor unit to access data stored in said memory, an apparatus for protecting data stored in said memory, comprising monitor means for detecting the first machine cycle of said processor unit and in response generating a status signal to identify machine cycles of said processor unit, means for storing said status signal; memory access means for generating a memory access signal for accessing said memory and means responsive to said stored status signal and said memory access signal for enabling access of data stored in said memory only if access of said data is in response to an instruction fetched from said memory.

3. In a computer having a processor unit, a memory and a bus interfacing said processor unit and said memory, said processor unit being operative in an OP-FETCH machine cycle to fetch an instruction stored in said memory, an apparatus for protecting data stored in said memory, comprising means for monitoring machine cycles of said processor; means responsive to said monitoring means for generating an OP-FETCH signal when said processor unit is the OP-FETCH machine cycle, means for storing said OP-FETCH signal until a subsequent machine cycle of said processor, memory access means for generating a memory access signal for memory access in response to a fetch instruction, and means responsive to said OP-FETCH signal and said memory access signal for enabling access of data stored in said memory during said subsequent machine cycle only if said instruction was previously fetched from said memory.

4. In a computer having a processor unit, a memory having stored therein instructions and data and a bus interfacing said processor unit and said memory, said processor unit being operative in an OP-FETCH machine cycle to fetch an instruction stored in said memory and in a read memory machine cycle for accessing data stored in the memory and having status register means identifying machine cycles of said processor unit; an apparatus for protecting contents of said memory, comprising memory access means for generating a memory access signal to access said memory for an operation, monitoring means responsive to said status register means for generating an OP-FETCH signal identifying an OP-FETCH machine cycle of said processor unit, means for storing said OP-FETCH signal and means responsive to said memory select signal and said stored OP-FETCH signal for enabling access of data stored in said memory in response to an instruction only if said instruction was previously fetched from said memory.

5. The apparatus of any one of claims 1-4, wherein said processor unit includes a microprocessor having a housing and external terminals, said bus being within said housing and coupled to said terminals, and switch means within said bus, said processor unit being further operative in an I/O machine cycle wherein said processor unit communicates through said external terminals to peripheral devices, second means responsive to said monitoring means for identifying an I/O machine cycle and means responsive to said second means and said memory select means for operating said switch means to halt said bus during memory select while said processor unit is in other than an I/O machine cycle.

6. The apparatus of any of claims 1-4, including verification means for controlling said access enabling means to enable verification of contents of said memory.

7. The apparatus of claim 6, wherein said verification means includes fuse means connected in circuit with said bus means, and means for open circuiting said fuse means.

8. The apparatus of any one of claims 1-4, wherein said storing means includes a flip flop.

9. In a computer having a processor unit, a memory and a bus interfacing said processor unit and said memory, said processor unit being operative to fetch instructions from said memory and in response to instructions to access data stored in said memory, a method of protecting data stored in said memory, comprising the steps of monitoring status of said processor unit to identify an instruction fetch machine cycle and in response generating a status signal to identify machine cycles of said processor unit; storing said status signal; generating a memory access signal during selection of said memory by said processor unit to perform an operation and responding to said stored status signal and said memory access signal to enable access to data stored in said memory in response to an instruction only if the instruction was previously fetched from said memory.

10. The method of claim 9, wherein said processor unit includes status register means for identifying machine cycle status, said monitoring step including monitoring signals developed by said status register means.

11. The method of claim 9, including the step of generating an I/O status signal identifying an I/O machine cycle of said processor unit wherein said processor unit is in communication with an external peripheral device on said bus and placing said bus in a HALT state in response to said I/O status signal and said memory access signal during memory access when said processor unit is in other than an I/O machine cycle.

12. The method of claim 11, including the step of verifying contents of said memory by enabling access to data stored in said memory even if the instruction was fetched from other than said memory.

13. The method of claim 12, wherein said verifying step further includes inhibiting placement of the bus in the HALT state.

14. The apparatus of any one of claims 1-4, including logic means for determining whether said processor unit is operating in an I/O cycle, said memory access enabling means being further responsive to said logic means for enabling memory access when said process unit is in an I/O operating cycle.

* * * * *